United States Patent Office 3,215,491
Patented Nov. 2, 1965

3,215,491
PRODUCTION OF ALKALI METAL
BOROHYDRIDES
Friedrich Schubert and Konrad Lang, Leverkusen, Germany, assignors to Farbenfabriken Bayer Aktiengesellschaft, Leverkusen, Germany, a German corporation
No Drawing. Filed Sept. 7, 1960, Ser. No. 54,367
Claims priority, application Germany, Sept. 12, 1959,
F 29,375; Nov. 12, 1959, F 29,839
16 Claims. (Cl. 23—14)

The present invention relates to the production of alkali metal borohydrides, and more particularly to a process for the production of alkali metal borohydrides in which an alkali metal hydride is reacted with a boron trihalide or a boron trihalide addition compound in the presence of an aminoborine alone, or optionally in the additional presence of a co-addition member.

The production of alkali metal borohydrides by reaction of alkali metal hydrides with boron compounds is known.

Thus, P. P. Winternitz describes the reaction of lithium hydride with boron trifluoride; the production of sodium borohydride by reaction of sodium hydride with boric acid anhydride, boric acid trialkyl esters, sodium trimethoxyborohydride, or sodium tetrafluoroboride is also known. The execution of the reaction in high boiling mineral oils has been described by Banus et al. In addition, borohydrides can also be obtained by reaction of boron trialkyls, hydrogen, and metal hydrides. Other boron compounds suitable for the conversion of alkali metal hydrides to borohydrides are N-trialkylborazanes, alkylboranes, and diborane.

All these processes possess the great disadvantage that during the formation of the sodium borohydride by topo-chemical reactions, the sodium hydride becomes covered on the surface with a layer of borohydride, and that the reaction is thereby arrested.

In order to overcome this phenomenon, use has been made as reaction medium of solvents for the borohydride to be prepared, e.g. ether or tetrahydrofuran during the production of lithium borohydride, or diethyleneglycoldimethyl ether for soduim borohydride. These solvents are either very volatile and inflammable, or very expensive, so that in each of these cases, production of borohydrides becomes uneconomic.

Another possibility consists in the use of a very finely divided alkali metal hydride. However, extensive and complicated apparatus is required for the production of this special form of the hydride.

A third possibility is offered by the use of catalysts for example of metal alcoholates for the catalysis of the reaction between metal hydrides with boron oxide. It is known of the boric acid trialkyl esters, boron trialkyls, and aluminum alkyls, and also of alkylboric acid esters which are active as catalysts for the reaction of sodium hydride with boron halides, that with sodium hydride they form addition compounds soluble in organic solvents, such as Na[HB(OCH$_3$)$_3$] or Na[HB(C$_2$H$_5$)$_3$].

However, these catalysts are compounds which can only be handled with difficulty. Metal alcoholates, boric acid esters, alkylboric acid esters, and aluminum alkyls are substances which are extremely sensitive towards moisture, the above mentioned aluminum compounds having an explosive reaction with water. Boron trialkyls, alkylboric acid esters, and aluminum alkyls are very sensitive towards oxygen; the compounds with low carbon content are in fact spontaneously inflammable in air.

Moreover, only boron trichloride and its derivatives are subject to the above described catalysed reaction with sodium hydride.

The object of the present invention is a process for the manufacture of alkali metal borohydrides by reaction of alkali metal hydrides with boron halide compounds in the presence of catalysts which are stable towards atmospheric oxygen and moisture.

A further object is the use of catalysts which are also active during the reaction of alkali metal hydrides with boron fluoride compounds which are available on appreciately more economic terms.

It has been found, that the reaction of alkali metal hydrides with boron halide compounds, for instance the reaction of sodium hydride with the addition compounds of boron trifluoride with organic ethers, which in absence of catalysts only proceeds to give yields of 12–15%, attains an increase in yield, for example to 94.5% of theory, when compounds of the composition to be described below are added.

As catalysts for the process according to the invention, use is made of aminoborines of the formula

$$R_nB(NR'R'')_{3-n}$$

In this, there represent: $n$=a whole number from 0 to 2, R=hydrogen or an alkyl or an aryl radical, R'=hydrogen or an aromatic or aliphatic radical such as alkyl, aryl, dialkylether, alkyl-arylether, halo-alkyl, halo-aryl, dialkylaminoalkyl, and dialkylaminoaryl, and R''=an aromatic or aliphatic radical such as alkyl, aryl, dialkylether, alkyl-arylether, halo-alkyl, halo-aryl, dialkylaminoalkyl, and dialkylaminoaryl.

As examples of R, there may be mentioned: hydrogen, the methyl, ethyl, propyl, butyl, amyl, hexyl, octyl, decyl, dodecyl, hexadecyl, heptadecyl, octadecyl, phenyl, o-tolyl, m-tolyl, p-tolyl, naphthyl, methylnaphthyl, diphenylyl, xylyl, ethylphenyl, hexylphenyl, dodecylphenyl group.

R'' may denote, for instance: aliphatic hydrocarbon radicals such as the ethyl, propyl, butyl, amyl, hexyl, octyl, decyl, dodecyl, hexadecyl, heptadecyl, octadecyl group; aliphatic ether residues such as the methoxymethylene (CH$_3$OCH$_2$—), ethoxy-methylene, methoxyethylene, ethoxypropylene, methoxybutylene, methoxydodecylene residue; halogenated hydrocarbon residues such as the β-chloroethyl, γ-chloropropyl residue; tertiary amine residues such as the dimethylaminoethylene, dimethylaminopropylene, dimethylaminopentylene residue; aromatic hydrocarbon residues such as, for instance, the phenyl, o-, p-, m-tolyl, xylyl groups, the naphthyl, methylnaphthyl, diphenylyl, ethylphenyl, hexylphenyl, dodecylphenyl, hexylnaphthyl radicals; aromatic ether resides such as the p-methoxyphenyl, p-ethoxyphenyl, methoxynaphthyl, ethoxynaphthyl, methoxyethylenephenyl group; halogenated aromatic hydrocarbon residues such as the p-chlorophenyl, dichlorophenyl, bromonaphthyl, dichloronaphthyl residue; tertiary aromatic amine radicals such as the dimethylaminophenyl, diethylaminophenyl, dimethylaminonaphthyl, diethylaminonaphthyl radical.

R' may possess the same significance as R'' or may be hydrogen, whereby R' and R'' may also denote different organic residues.

The above defined aminoborine catalysts are added in amounts of 0.5–50%, by weight, referred to the alkali metal hydride.

It is not necessary to employ the aminoborines by themselves, and instead it is possible to couple the borohydride synthesis with aminoborine production.

For this purpose, the reaction of N-trialkylborazanes with primary or secondary amines as well as the reaction of metal hydrides or metal borohydrides with boron halides and primary or secondary amines are particularly suitable.

Accordingly, it is possible to react alkali metal hydrides with boron trihalides or their derivatives, and employ as catalyst for this purpose the mixture of an N-alkylborazane with an amine of the formula R'R''NH, wherein R' and R'' possess the above specified significance. Thereby, the proportions of borazane and amine in the mixture correspond to one of the two equations:

$$Amine \cdot BH_3 + 3R'R''NH \rightarrow B(NR'R'')_3 + 3H_2 + Amine$$

or $$Amine \cdot BH_3 + 2R'R''NH \rightarrow HB(NR'R'')_2 + 2H_2 + Amine$$

In these equations, "Amine" denotes a secondary or tertiary amine, e.g. pyridine, trimethylamine, triethylamine, tripropylamine, tributylamine, cyclohexyldimethylamine, dimethylamine, diethylamine, or dibutylamine.

In place of an aminoborine, an alkali metal borohydride, possibly in the form of a crude borohydride retained in the reaction vessel from the previous batch, may be added to the reaction mixture together with an amine of formula R'R''NH, whereupon the formation of an aminoborine results when the boron trihalide is added:

$$3NaBH_4 + 4BF_3 + 12R'R''NH$$
$$\rightarrow 4B(NR'R'')_3 + 3NaBF_4 + 12H_2$$
$$3NaBH_4 + 4BF_3 + 8R'R''NH$$
$$\rightarrow 4HB(NR'R'')_3 + 3NaBF_4 + 8H_2$$

The amounts of amine, alkali metal borohydride, and boron trihalide required for the catalyst formation follow from the two preceding equations.

In place of an alkyl aminoborine, it is possible to add to the reaction mixture an alkyl- or aryl-diborane of the formula $(R_nBH_{3-n})_2$ wherein $n$ denotes 1 or 2, together with $(6-2n)$ times the molar amount of an amine of the formula R'R''NH. The equation for the formation of the alkyl aminoborine at $n=2$ (tetraalkyldiborane) is:

$$R_4B_2H_2 + 2R'R''NH \rightarrow 2R_2BNR'R'' + 2H_2$$

For the process according to the invention, the metal hydride used by preference is sodium hydride, which is readily available in commerce, but lithium hydride, potassium hydride, and the other alkali metal hydrides may also be employed. It is not necessary to employ the alkali metal hydrides by themselves, and instead they may also be prepared in situ, e.g. from alkali metal and hydrogen.

It is preferred to use boron trihalides as boron halide compounds: boron trifluoride, boron trichloride, boron tribromide, or boron triiodide. Suitable frms of application of the boron trihalides are their addition compounds with lower alkyl- or cyclic alkyl-ethers, such as dimethyl ether, diethyl ether, dipropyl ether, diisopropyl ether, dibutyl ether, tetrahydrofuran, dioxane, morpholine, dimethyl-ethers of diethyleneglycol, ethyleneglycol, or triethyleneglycol, or addition compounds with tertiary alkyl-, aryl-, and mixed alkylaryl-amines, i.e. N-alkyl-N-arylamines, such as trimethylamine, triethylamine, tripropylamine, tributylamine, dimethylaniline, dipropylaniline, dipropylamine, dimethylaminonaphthalene, and also with tertiary ring-shaped nitrogeneous bases such as pyridine, N-methylmorpholine, N-methylpiperidine; furthermore, the addition compound $Na_2O \cdot 4BF_3$.

The reaction is carried out in high boiling inert suspension agents. For this purpose, use may be made of: aliphatic and aromatic hydrocarbons or their mixtures with a boiling point above 180° C., as well as inert oils such as tetraalkylsilanes, ethers, and polyethers with boiling points above 180° C.

The reaction is carried out at temperatures between 30° C. and the decomposition temperature of the borohydrides at the corresponding pressure, preferably at temperatures between 100 and 250° C.

Owing to the relatively low reaction temperatures, the application of a pressure deviating from normal pressure is not necessary. If it should be required, e.g. when use is made of low boiling solvents or during removal of the high boiling solvent fractions, excess pressure or vacuum may be employed without hesitation.

According to a preferred method of carrying out the process, 0.5 to 50%, by weight (referred to the alkali metal hydride), of a tertiary amine or of an ether, which forms addition compounds with boron trihalides, are added as cocatalyst to the reaction mixture. As examples, there may be mentioned, for example triethylamine, tripropylamine, tributylamine, N-dimethylcyclohexylamine, dimethylaniline, diethylaniline, pyridine, N-methylmorpholine, N-methylpiperidine, tetrahydrofuran, dibutyl ether, ethyleneglycol-dimethyl ether, diethyleneglycol-dimethyl ether.

The catalytic effect of compounds having the formula $R_nB(NR'R'')_{3-n}$ is surprising since though it is known that boric acid esters and boron trialkyls form addition compounds with alkali metal hydrides, whereby a modified reaction behaviour of these hydrides would be understandable, but similar complex compounds are not known of the catalysts according to the invention.

In contrast to the boric acid trialkyl esters which are very sensitive towards moisture and whose preparation, as in the case of boric acid trimethyl ester, is often attended by difficulties, and to the boron trialkyls which also can only be prepared and manipulated with difficulty owing to their tendency towards spontaneous combustion, the aminoborines are in practice stable towards atmospheric oxygen and moisture.

Therefore, their application represents a technical advance compared with the application of the previously known catalysts. The aminoborines according to the invention are readily available by reaction of N-alkylborazanes, alkali metal boranates or borohydrides and boron halides or alkyldiboranes with primary or secondary amines.

The following examples are given for the purpose of illustrating the invention.

*Example 1*

100 ml. of toluene, 25 ml. of triethylamine, and 10–20 g. of catalyst are dissolved and 48 g. of sodium hydride are suspended in 500 ml. of a mineral oil boiling at 230–280° C. 70 g. of boron trifluoride -tetrahydrofuran are then added dropwise at 120° C. with stirring, the mixture boiled under reflux for 1.5 hours, distilled off up to 110° C., and the residue heated to 200° C. for 3 hours. After cooling, it is filtered, briefly rinsed, and the dried residue is extracted with liquid ammonia. The yield by use of the following catalysts amount to:

| | Percent of theory |
|---|---|
| No catalyst | 11 |
| $(C_2H_5)_3N$ | 15 |
| $(C_3H_7)_2BN(C_4H_9)_2$ | 71 |
| $(C_3H_7)_2BNC_{12}H_{25}$ | 94.5 |
| $\quad\vert$ | |
| $\quad H$ | |

*Example 2*

$4NaH + BF_3 \cdot C_4H_8O \rightarrow NaBH_4 + 3NaF + C_4H_8O$ 48 g. (2 mol) of sodium hydride are suspended in a glass flask in a mixture of 500 ml. of a hydrocarbon mixture with a boiling range of 230–320° C. and 100 ml. of toluene, and 20 g. (0.075 mol) of hypoboric acid bisdibutylamine $(HB[N(C_4H_9)_2]_2)$ are added. Then, it is heated to 120° C., 70 g. (0.5 mol) of boron trifluoride tetrahydrofuranate $(BF_3 \cdot C_4H_8O)$ are added dropwise with stirring, the mixture heated to 140° C. with stirring, and boiled under reflux for 1½ hours. Thereupon, the tetrahydrofuran is distilled off, and the whole heated to 200° C. for 3 hours, allowed to cool, filtered, and rinsed with toluene. In addition, to sodium fluoride, the produced sodium borohydride remains in the filtration residue at a yield of 76% of theory, and can be isolated from it in known manner by extraction with isopropylamine. When the reaction is carried out in the absence of the catalyst under otherwise identical conditions, the yield only amounts to 11% of theory.

*Example 3*

70 g. of boron trifluoride tetrahydrofuranate are added dropwise at 120° C., with stirring, to a mixture of 500 ml. of a hydrocarbon mixture with a boiling range of 230–320° C., 100 ml. of toluene, 20 g. of boric acid trisanilide, and 48 g. of sodium hydride. Formation of foam thereby occurs. The mixture is heated to 140° C., maintained at this temperature for 1½ hours, and the tetrahydrofuran and toluene are then distilled off. Then, it is heated to 200–220° C. for another 3 hours, cooled, and filtered. Sodium borohydride is obtained in a yield of about 30% of theory.

*Example 4*

The reaction is carried out in an analogous manner to Example 3 but with the addition of a tertiary amine as follows:

70 g. of boron trifluoride tetrahydrofuranate are added dropwise at 120° C. with strong stirring to a mixture of 500 ml. of a hydrocarbon mixture with a boiling range of 230–320° C., 100 ml. of toluene, 25 ml. of triethylamine, 20 g. of boric acid trisanilide and 48 g. of sodium hydride. There is practically no formation of foam. It is further heated to 140° C., stirred for 1½ hours at this temperature, and the toluene, amine, and tetrahydrofuran are then distilled off. The mixture is then heated at 200–220° C. for 3 hours, cooled, and filtered. The yield of sodium borohydride is up to 50% higher than in Example 3.

*Example 5*

48 g. of sodium hydride are suspended in a mixture of 500 ml. of a hydrocarbon mixture with a boiling range of 230–320° C. and 100 ml. of toluene, and 29 g. of di-butylamine are added. The mixture is heated to 120° C., and 13 g. of N-triethylborazane are then introduced, and thereafter 70 g. of boron trifluoride tetrahydrofuranate. The viscosity of the reaction mixture increases temporarily. The mixture is boiled under reflux for 2 hours, distilled off up to a boiling temperature of 130° C., heated to 200–220° C. for another 3 hours, cooled, filtered, rinsed with toluene, and dried. Yield of $NaBH_4$: 82% of theory.

We claim:
1. Process for the production of alkali metal borohydride which comprises reacting alkali metal hydride with a member selected from the group consisting of boron trihalide, $Na_2O \cdot 4BF_3$, and addition compounds of boron trihalide with compounds selected from the group consisting of di-lower alkylethers, tetrahydrofuran, dioxan, morpholine, tertiary alkyl amines, pyridine, tertiary mixed N-alkyl-N-phenyl amines, tertiary mixed N-alkyl-N-naphthyl amines, N-methyl morpholine, and N-methyl piperidine, in the simultaneous presence of of between about 0.5–50% by weight based upon the alkali metal hydride present of an aminoborine of the formula

$R_nB(NR'R'')_{3-n}$ wherein R is selected from the group consisting of hydrogen, alkyl, and phenyl and naphthyl radicals, R' is selected from the group consisting of hydrogen, alkyl, phenyl and naphthyl radicals, dialkyl ether radicals, alkyl-phenyl ether radicals, alkyl-naphthyl ether radicals, halo-alkyl, halo-phenyl, halo-naphthyl, dialkylamino-alkyl, dialkyl-amino phenyl radicals, and dialkyl-amino naphthyl radicals, and R'' is selected from the group consisting of alkyl, phenyl and naphthyl radicals, dialkyl-ether radicals, alkyl-phenyl ether radicals, alkyl-naphthyl ether radicals, halo-alkyl, halo-phenyl, halo-naphthyl radicals, dialkylaminoalkyl, dialkylamino phenyl radicals, and dialkylamino naphthyl radicals, and $n$ is a whole number having a value from 0–2, at a temperature between about 30° C. and the decomposition temperature of the alkali metal borohydride being produced in a high boiling inert liquid suspension medium having a boiling point above about 180° C.

2. Process according to claim 1 wherein the temperature is maintained between about 100–250° C.

3. Process according to claim 1 wherein the inert liquid suspension medium is selected from the group consisting of aliphatic hydrocarbons having a boiling point above about 180° C., aromatic hydrocarbons having a boiling point above about 180° C., and mixtures thereof having a boiling point above about 180° C., tetraalkylsilanes having a boiling point above about 180° C., ethers having a boiling point above about 180° C., and polyethers having a boiling point above about 180° C.

4. Process according to claim 2 wherein the alkali metal hydride is sodium hydride.

5. Process according to claim 2 wherein together with the aminoborine a co-addition member capable of forming an addition compound with boron trihalide is used which is selected from the group consisting of triethylamine, tripropylamine, tributylamine, N-dimethylcyclohexylamine, dimethylaniline, diethylaniline, pyridine, N-methylmorpholine, N-methylpiperidine, tetrahydrofuran, dibutyl ether, ethyleneglycol-dimethyl ether, and diethyleneglycol-dimethyl ether.

6. Process according to claim 5 wherein the co-addition member is used in an amount between about 0.5–50% by weight based upon the alkali metal hydride present.

7. Process according to claim 6 wherein the aminoborine used is boric acid trisanilide of the formula $B(NHC_6H_5)_3$ and the co-addition member used is triethylamine.

8. Process according to claim 6 wherein the aminoborine used is dipropylboronic acid di-n-butylamide of the formula $(C_3H_7)_2BN(C_4H_9)_2$ and the co-addition member used is triethylamine.

9. Process according to claim 1 wherein the aminoborine used is hypoboric acid di-n-butylamide of the formula $HB[N(C_4H_9)_2]$.

10. Process according to claim 1 wherein the aminoborine used is boric acid trisanilide of the formula $B(NHC_6H_5)_3$ 11. Process according to claim 1 wherein the alkali metal hydride is prepared in situ by reacting an alkali metal with hydrogen.

12. Process according to claim 1 wherein the aminoborine is prepared in situ by reacting an amine of the formula R'R''NH, in which R' and R'' have the same meaning as in claim 1, with an amineborane selected from the group consisting of pyridine borane, N,N,N-trilower alkylamine borane, and N,N-dilower alkylamine borane.

13. Process according to claim 1 wherein the aminoborine is prepared in situ by reacting an amine of the formula R'R"NH, in which R' and R" have the same meaning as in claim 1, with an alkali metal borohydride and a boron halide.

14. Process according to claim 1 wherein the aminoborine is prepared in situ by reacting two moles of di-n-butylamine with one mole of triethylamine borane.

15. Process according to claim 1 wherein the aminoborine is prepared in situ by reacting an amine of the formula R'R"NH, with a hydrocarbon substituted diborane of the formula $(RBH_2)_2$, with R, R' and R" having the same meaning as in claim 1.

16. Process according to claim 1 wherein the aminoborine is prepared in situ by reacting an amine of the formula R'R"NH, with a hydrocarbon substituted diborane of the formula $(R_2BH)_2$, with R, R' and R" having the same meaning as in claim 1.

References Cited by the Examiner
UNITED STATES PATENTS
2,880,058   3/59   Bronaugh _____ 23—14

OTHER REFERENCES

Schechter et al.: "Boron Hydrides and Related Compounds," prepared under Contract NO2(s) 10992 for Dept. of Navy Bureau of Aeronautics, prepared by Callery Chemical Co., declassified December 1953, pages 51, 93 and 94.

MAURICE A. BRINDISI, *Primary Examiner.*

UNITED STATES PATENT OFFICE
CERTIFICATE OF CORRECTION

Patent No. 3,215,491                        November 2, 1965

Friedrich Schubert et al.

It is hereby certified that error appears in the above numbered patent requiring correction and that the said Letters Patent should read as corrected below.

Column 2, line 55, for "resides" read -- residues --; column 3, line 62, for "frms" read -- forms --; line 71, after "dimethylaniline," insert -- diethylaniline, --; same column 3, line 72, strike out "dipropylamine,"; column 5, line 75, strik out "of", first occurrence.

Signed and sealed this 21st day of June 1966.

(SEAL)

Attest:

ERNEST W. SWIDER
Attesting Officer

EDWARD J. BRENNER
Commissioner of Patents